(12) United States Patent
Hellmuth et al.

(10) Patent No.: US 11,303,171 B2
(45) Date of Patent: Apr. 12, 2022

(54) DRIVE DEVICE

(71) Applicant: Siemens Aktiengesellschaft, Munich (DE)

(72) Inventors: Torsten Hellmuth, Erlangen (DE); Wolfgang Lau-Bomert, Kassel (DE)

(73) Assignee: Siemens Aktiengesellschaft, Munich (DE)

( * ) Notice: Subject to any disclaimer, the term of this patent is extended or adjusted under 35 U.S.C. 154(b) by 287 days.

(21) Appl. No.: 16/322,836

(22) PCT Filed: Jul. 25, 2017

(86) PCT No.: PCT/EP2017/068733
§ 371 (c)(1),
(2) Date: Feb. 1, 2019

(87) PCT Pub. No.: WO2018/024538
PCT Pub. Date: Feb. 8, 2018

(65) Prior Publication Data
US 2019/0181706 A1 Jun. 13, 2019

(30) Foreign Application Priority Data
Aug. 3, 2016 (EP) ..................... 16182608

(51) Int. Cl.
*H02K 1/27* (2006.01)
*H02K 41/03* (2006.01)
(Continued)

(52) U.S. Cl.
CPC ......... *H02K 1/2786* (2013.01); *H02K 1/2793* (2013.01); *H02K 41/031* (2013.01); *H02K 1/148* (2013.01)

(58) Field of Classification Search
CPC .... H02K 1/2786; H02K 41/031; H02K 7/003; H02K 1/187; H02K 21/22; H02K 1/28;
(Continued)

(56) References Cited

U.S. PATENT DOCUMENTS

| 4,663,870 A | 5/1987 | Bodet et al. |
| 7,872,389 B2 | 1/2011 | Leiber |

(Continued)

FOREIGN PATENT DOCUMENTS

| AU | 2017306824 | 2/2019 |
| CA | 2758469 | 10/2010 |

(Continued)

OTHER PUBLICATIONS

Search Report dated Mar. 16, 2020 issued in Chile Patent Application No. 201900231.
(Continued)

*Primary Examiner* — Ahmed Elnakib
(74) *Attorney, Agent, or Firm* — Cozen O'Connor

(57) ABSTRACT

A drive device for a working machine for heavy industry, particularly for the raw-materials and mining industry, includes a permanent-magnet-excited motor and a frequency converter, wherein the motor has a rotor and a stator, and wherein the motor is a segment motor, in the case of which the rotor and/or the stator is composed of a plurality of segments, where considerable improvement in the availability of the motor is achieved because the motor has a segmented design, whereby the reliability during operation of the drive device is also increased.

17 Claims, 2 Drawing Sheets

(51) Int. Cl.
*H02K 1/14* (2006.01)
*H02K 1/2786* (2022.01)
*H02K 1/2793* (2022.01)

(58) Field of Classification Search
CPC .. H02K 21/24; H02K 2205/03; H02K 7/1823; H02K 49/106; H02K 1/2706; H02K 1/2793; H02K 1/148
USPC ............... 310/156.08, 112–114; 241/156.08
See application file for complete search history.

(56) References Cited

U.S. PATENT DOCUMENTS

| | | | |
|---|---|---|---|
| 8,172,643 B2 | 5/2012 | Yilmaz et al. | |
| 9,051,157 B2 | 6/2015 | Breidenstein et al. | |
| 9,861,774 B2 | 1/2018 | Fu et al. | |
| 10,112,778 B2 * | 10/2018 | Kacel | B65G 13/06 |
| 2002/0021973 A1 | 2/2002 | Nelson | |
| 2003/0094524 A1 | 5/2003 | Scuccato | |
| 2004/0251767 A1 | 12/2004 | Chiarenza | |
| 2008/0231134 A1 | 9/2008 | Lieber | |
| 2009/0051253 A1 | 2/2009 | Rettner | |
| 2009/0206684 A1 | 8/2009 | Jajtic et al. | |
| 2010/0083851 A1 | 4/2010 | Matscheko et al. | |
| 2012/0126740 A1 | 5/2012 | Kauppi | |
| 2013/0166237 A1 | 6/2013 | Huber et al. | |
| 2013/0306773 A1 | 11/2013 | Kümmlee et al. | |
| 2014/0021279 A1 * | 1/2014 | Rittler | H02K 21/16 241/117 |
| 2014/0291126 A1 | 10/2014 | Becker et al. | |
| 2015/0365036 A1 | 12/2015 | Müssenberger et al. | |
| 2017/0159664 A1 * | 6/2017 | Du | F04D 25/088 |
| 2019/0181706 A1 | 6/2019 | Hellmuth et al. | |

FOREIGN PATENT DOCUMENTS

| | | |
|---|---|---|
| CA | 3004702 | 4/2017 |
| CL | 2013001651 | 11/2013 |
| CN | 201975970 U | 9/2011 |
| CN | 102035319 B | 7/2012 |
| DE | 2034307 | 1/1972 |
| DE | 102010040724 | 3/2012 |
| EP | 1144813 | 4/2003 |
| EP | 2088664 | 8/2009 |
| EP | 2481701 | 8/2012 |
| EP | 2562102 | 2/2013 |
| EP | 3280038 | 2/2018 |
| EP | 3459163 | 3/2019 |
| WO | WO 91/05953 | 5/1991 |
| WO | WO 00/39435 | 7/2000 |
| WO | WO 2006/000260 | 1/2006 |

OTHER PUBLICATIONS

PCT International Search Report and Written Opinion of International Searching Authority dated Aug. 21, 2017 corresponding to PCT International Application No. PCT/EP2017/068733 filed Jul. 25, 2017.

PCT International Preliminary Examination Report and Written Opinion of International Examination Authority dated Sep. 28, 2018 corresponding to PCT International Application No. PCT/EP2017/068733 filed Jul. 25, 2017.

* cited by examiner

DRIVE DEVICE

CROSS-REFERENCE TO RELATED APPLICATIONS

This is a U.S. national stage of application No. PCT/EP2017/068733 filed Jul. 25, 2017. Priority is claimed on EP Application No. 16182608 filed Aug. 3, 2016, the content of which is incorporated herein by reference in its entirety.

BACKGROUND OF THE INVENTION

1. Field of the Invention

The invention relates to a drive apparatus for a processing machine for heavy industry, in particular for the raw material and mining industry, and further relates to a processing machine and also to use of the drive apparatus.

2. Description of the Related Art

In heavy industry, in particular in the raw material and mining industry, processing machines having high drive powers are used to fulfill the assigned tasks. Such processing machines are, e.g., bucket-wheel excavators, belt conveyors, crushers, mills and shaft conveyor systems. In addition to the level of the drive power and the torque, modern drives must also meet further requirements. These are, e.g., the provision of various rotational speeds and torques depending on the demands of the processing machine, the distribution of loads, e.g., with multiple drives and the prevention or restriction of load spikes. Furthermore, stringent requirements are placed on the reliability and the efficiency of the drives.

Conventional drive apparatuses are composed of a plurality of components, these particularly including in a frequency converter, an electric motor, a coupling, a gear unit, optionally a further coupling and a braking apparatus. As the number of components increases, however, so too does the failure probability of the drive. For this reason, direct drives are being more and more frequently used in the above-mentioned processing machines.

Published unexamined application EP 2 562 102 A1 discloses an exemplary direct drive for a belt conveyor system. As a rule, a direct drive is solely composed of a frequency converter and an electric motor, with a coupling and a braking apparatus also optionally being included. This enables a series of advantages, inter alia, the reliability of the drive is improved as the number of components is lower, with the maintenance outlay likewise becoming lower.

As a rule, the electric motors for use in a direct drive are slow running synchronous motors which, by way of the direction connection with the processing machine, make available a necessary high torque and a low rotational speed. Such synchronous motors comprise a stator and a rotor. The rotor is mechanically connected to the processing machine. Between the rotor and the stator, there is no direct mechanical contact, with these being separated from one another by an air gap (depending on application from 2 mm to 20 mm). If the air gap is not maintained, this results in considerable damage in the motor. In this context, the rotor and the stator are mounted in a mechanically separate manner. Consequently, a greater outlay is necessary for maintaining the air gap. To secure the air gap, the foundations or the support structure are dimensioned particularly strongly, so that a relative movement between rotor and stator is prevented to the greatest possible extent. Additionally, there may be provision for monitoring of an air gap to detect changes in a timely manner. On corresponding changes to the air gap, a signal is generated that can lead to the shutdown of the drive.

As a rule, the synchronous motors used are externally excited, i.e., the rotor is supplied with an excitation current via slip rings. The slip rings, particularly the brushes for transferring the excitation current, are parts that are subject to wear. The monitoring, maintenance and replacement thereof occurs as part of the system maintenance.

In mobile or semi-mobile processing machines, the weight of the drive apparatus is an important criterion. Lighter drive apparatuses enable lighter substructures and as a result lead to lighter and therefore lower-cost processing machines. Proceeding from conventional drive apparatuses, in terms of the topic of weight, the conventional direct drives are lighter for the same drive powers. If the complete system is taken into consideration, however, it is mostly heavier overall due to the additional outlay for ensuring the air gap in the motor.

Reliability and availability of the drive technology is a further important criterion for systems in the field of the raw material and mining industry. The fewer components are associated with a drive train, the higher the system availability.

In order to achieve a high system availability, operators often keep complete components of the drive apparatuses or even relevant parts of direct drives in stock as replacement parts, in order to be able to replace and/or repair the damaged components in the event of damage. There are also concepts and solutions with multiple drives in which, in the event of damage, a drive is deselected and operation of the processing machine is continued with one or more other drives at a partial power.

SUMMARY OF THE INVENTION

It is an object of the invention to provide a processing machine and a drive apparatus with a high reliability during operation.

This and other objects and advantages are achieved in accordance with the invention by a drive apparatus for a processing machine for heavy industry, in particular for the raw material and mining industry, comprising a motor excited by a permanent magnet, where the motor has a rotor and a stator and where the motor is a segment motor, in which the rotor and/or the stator is/are composed of a plurality of segments.

The invention is based on the idea of achieving a considerable improvement of the availability of the motor by the segmented construction of the motor, whereby the reliability of the drive apparatus during operation is also increased. As a result of a modular configuration and the replaceability, the greatest level of installation flexibility is achieved. Further advantages of a segment motor are the simpler handling and assembly, as well as the good scalability of the moment.

The segments comprise in particular both segments for the stator and also for the rotor, which produce a permanently excited synchronous motor composed accordingly. In particular, the motor segments are integrated on or in the respective processing machine. The embodiment as a permanently excited motor makes it possible to save slip rings and brushes, whereby the maintenance outlay and costs of replacement parts are reduced. The segments of the rotor, furthermore also referred to as rotor segments, are formed by permanent magnets. Only the segments of the stator, furthermore also referred to as stator segments, are cabled.

In accordance with a preferred embodiment, the rotor and the stator are mounted on a common bearing element. In this context, the bearing element is a rotating shaft or an axle. By this kind of bearing, a relative movement of the rotor and the stator with respect to one another is prevented and thus the necessary air gap is maintained. A load-bearing structure for the rotor and a load-bearing structure for the stator are formed such that a rotation of the rotor is made possible during operation of the processing machine while the stator is mounted with a fixed location.

In accordance with a further preferred embodiment, the drive apparatus furthermore comprises a frequency converter, where the segments of the stator can be supplied with electrical current by the frequency converter individually. The frequency converter makes it possible to control and regulate the motor in accordance with the requirements of the respective processing machine. By supplying the stator segments with current separately, a particularly high level of flexibility and operation of the processing machine that is as free from interruptions as possible are ensured, because upon failure of a stator segment the processing machine can continue to be driven at a reduced power. The actuation of the individual motor segments also makes it possible to operate the motor in partial load ranges if, e.g., a segment fails or even if the processing machine requires less drive power. On the one hand, this contributes to increasing the availability of the drive and, on the other, it makes it possible to react to the requirements of the processing machine in a very flexible manner. If, for example, no rated power is necessary, it is then possible to continue operation at a lower power. Individual stator segments are switched off for this purpose. In this manner, energy is saved and the power costs are reduced.

Preferably, the segments of the rotor are arranged in a circular manner. Here, the shape of the rotor is optimally adapted to the bearing element, which is in particular formed as a shaft or an axle. The number of rotor segments results from the number of permanently excited magnets, which in turn depends on the power. Depending on the size or necessary power of the motor, the number of rotor segments lies in a high two-digit or in the three-digit range.

Further preferably, the segments of the stator are assembled to form a stator with a partially circular shape. In this context, the number of stator segments depends on the power. The stator segments are particularly dimensioned larger than the rotor segments, which means that fewer stator segments are necessary. These are arranged around the rotor and, in particular, form a partial circle or arc. With a very high number of stator segments, these may also form a closed circle around the rotor.

In view of a simple assembly or exchange, the segments of the rotor and/or of the stator are preferably fastened to a load-bearing structure of the motor via a releasable connection. For example, the segments are screwed to the load-bearing structure. Other types of releasable force-fit or form-fit connections are also conceivable, however.

In accordance with a preferred embodiment, the bearing element is a rotatable shaft, the rotor is mounted on the shaft in a rotating manner and the stator is fastened to the shaft in a stationary manner. In particular, in this context, the segment motor is integrated into a rotating part of the processing machine via the rotor.

In accordance with an alternative preferred embodiment, the bearing element is a fixed axle, the rotor is mounted on the axle in a rotatable manner and the stator is arranged on the axle with a fixed position.

Advantageously, the motor is provided for operation up to 150 rpm, in particular up to 100 rpm. The motor, which in particular is a synchronous motor, is therefore optimally suitable for use in a direct drive, in which the drive apparatus is integrated in the processing machine to be driven.

It is also an object of the invention to provide a processing machine for heavy industry, in particular for the raw material and mining industry, comprising a drive apparatus in accordance with the disclosed embodiments.

It is also an object of the invention to provide the use of the drive apparatus in accordance with the invention as a direct drive in a processing machine for heavy industry, in particular for the raw material and mining industry.

The drive apparatus is preferably formed as a direct drive. In this context, a direct drive is understood to mean a gearless drive, in which no components are provided between the drive motor and a drive shaft which convert the rotational speed of the rotor into a different rotational speed of the drive shaft. The drive shaft is therefore rotated at the same rotational speed as predetermined by the rotor or rotors, if a plurality are present. In principle, for application as a direct drive a slow-running synchronous motor is provided (the number of rotations per minute lying in the two-digit or in the lower three-digit range in this context), which makes a high torque and a small rotational speed available to the processing machine. By integrating the drive apparatus onto or into the processing machine, considerable weight savings are achieved. It is possible to dispense with a separate motor housing, motor bearing and shaft, as the segments are integrated into or onto the processing machine.

Expediently, the processing machine is formed as a bucket-wheel excavator, a belt conveyor, a crusher, a mill or a shaft conveyor system. The use of a direct drive with a segment motor is not restricted to the aforementioned applications, however, with other electrically driven processing machines also being possibilities for the envisaged use in the raw material and mining industry.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment will be described in greater detail with reference to a drawing, shown schematically, in which.

DETAILED DESCRIPTION OF THE EXEMPLARY EMBODIMENTS

Figure 1:
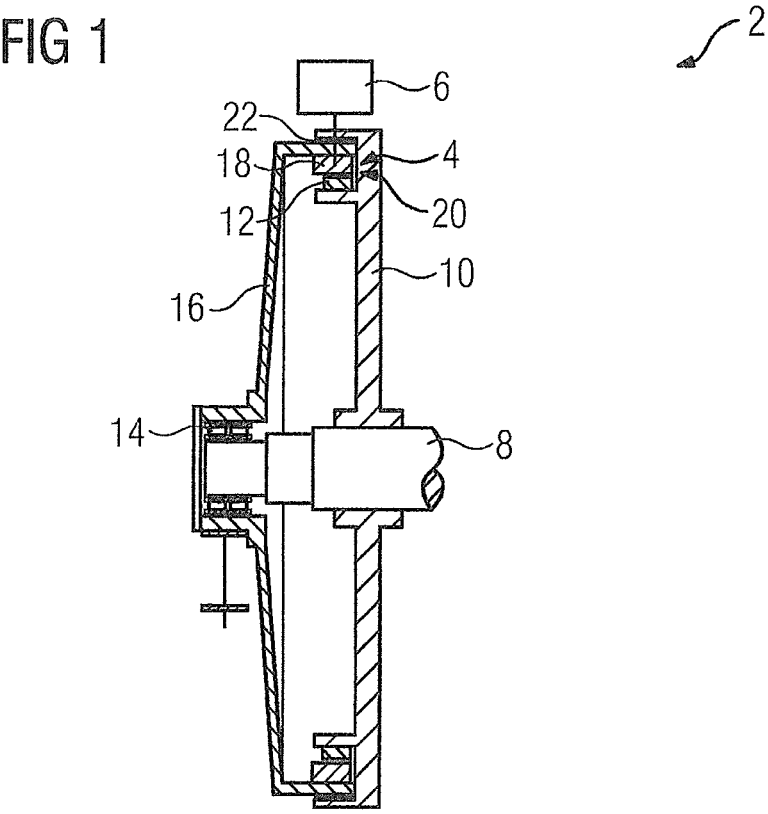
FIG. 1 shows a longitudinal section through a first embodiment of a drive apparatus in accordance with the invention.

The same reference characters have the same meaning in the figures.

Figure 2:
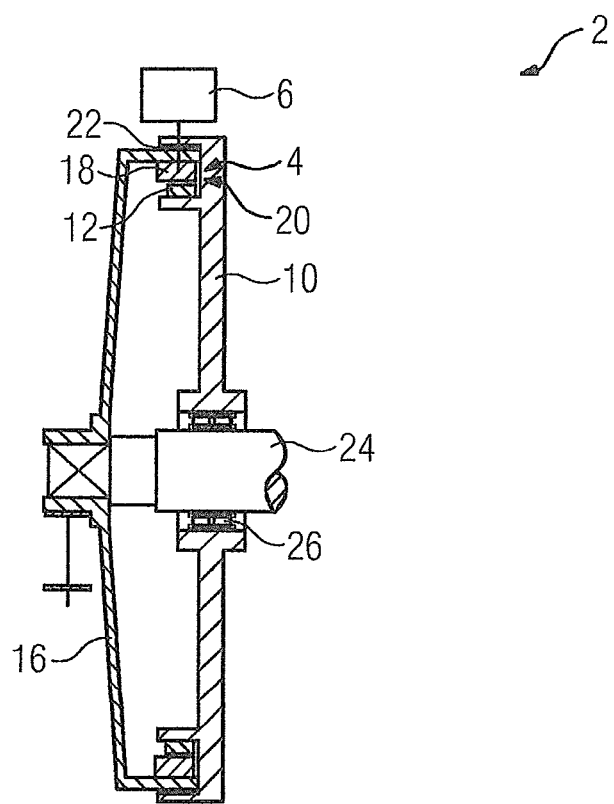
FIG. 2 shows a longitudinal section through a second embodiment of a drive apparatus in accordance with the invention.

In FIG. 1 and FIG. 2, a drive apparatus 2 is shown for application in the mining industry (e.g., in a bucket-wheel excavator, a mill, a crusher, or a belt conveyor). In this context, the drive apparatus 2 comprises a segment motor 4 as well as a frequency converter 6 (shown symbolically).

FIG. 1 shows a first embodiment of the drive apparatus, in which a rotor 10 of the segment motor 4 with a plurality of segments 12 is mounted on a rotatable shaft 8. The end of the shaft 8 is mounted in a bearing 14. A stator 16, which has a plurality of stator segments 18, is likewise fastened to the shaft 8, albeit in a stationary manner. The segments 18 of the stator 16 are individually supplied with electrical current by the frequency converter 6.

In the exemplary illustrated embodiment, the segments 12 of the rotor 10, furthermore referred to as rotor segments, are arranged in a circular manner around the shaft 8. The segments 18 of the stator 16, furthermore also called stator segments, can likewise form a circle, but are particularly arranged in a type of arc or partial circle-shaped formation (not shown in more detail here).

The number of rotor segments 12 and that of the stator segments 18 differ from one another, as the segments 12, 18 have different sizes. In a bucket-wheel excavator, for example, in particular approximately over 100 rotor segments 12 are provided, while the number of stator segments 18 varies as a function of the motor power, in particular between 12 and 16.

The rotor 10 and the stator 16 are not connected to one another mechanically, i.e., there is no direct contact. Rather, an air gap 20 is formed between the rotor segments 12 and the stator segments 18, which amounts to between 2 mm and 20 mm, for example, depending on the size of the segment motor 4 and the application. To protect from contamination, a seal 22 is additionally provided between the rotor 10 and the stator 16.

A second embodiment of the drive apparatus is shown in FIG. 2, in which the rotor 10 is arranged with the rotor segments 12 on a fixed axle 24. The rotation of the rotor 10 on the fixed axle 24 is made possible by a bearing 26. In this embodiment, the rotor 10 is directly mounted to the respective processing machine. In this case, the rotor 10 is part of a processing machine (not shown), i.e., the entire segment motor 4 is integrated in the processing machine. Here, the segment motor 4 and the processing machine are arranged on the same axle, meaning that the drive apparatus 2 drives the processing machine in the manner of a direct drive.

For the connection to a processing machine (e.g., belt conveyor, bucket wheel, crusher, shaft conveyor system), in principle there are two options:
a) The rotor 10 or the stator 16 is part of the processing machine. This case is shown in more detail in the example of a drive drum 30 for a belt conveyor in conjunction with FIG. 3.
b) The processing machine is fastened to the shaft 8 or the axle 24 separately, but the processing machine and the drive apparatus 2 share the same shaft 8 or axle 24 (not shown).

Figure 3:
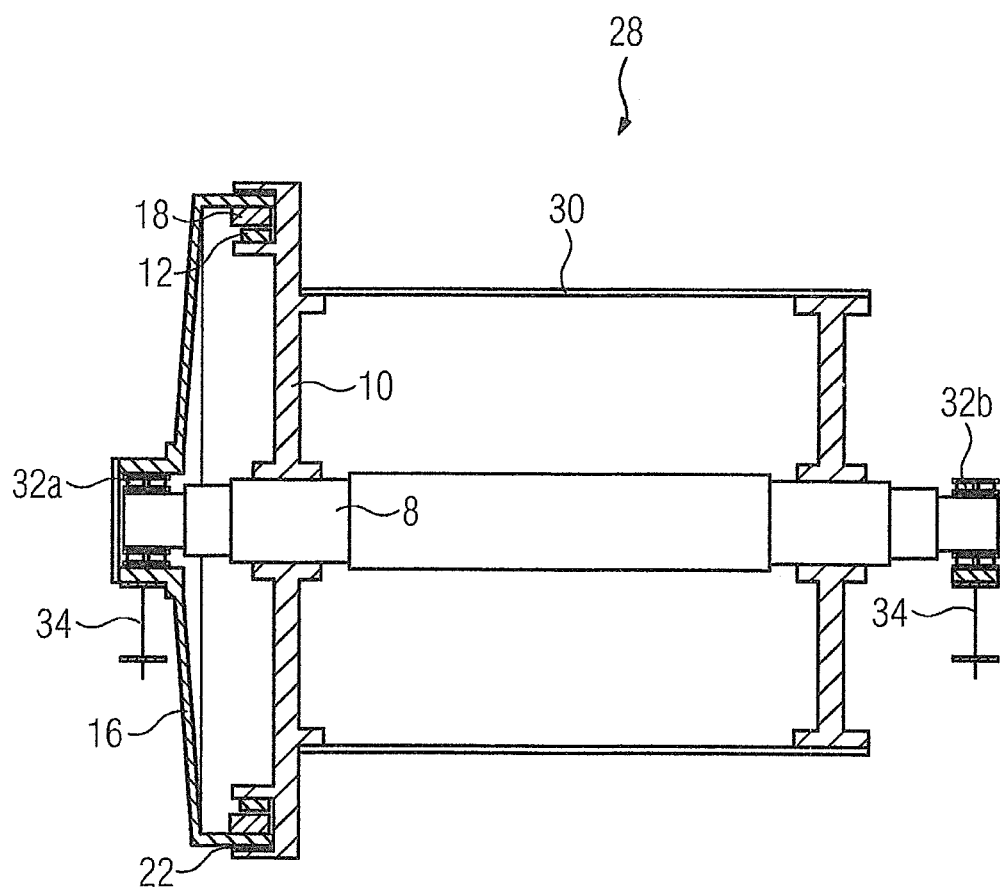
FIG. 3 shows a longitudinal section through a drive drum of a belt conveyor in accordance with the invention.

A direct drive is shown in FIG. 3. In accordance with FIG. 3, a belt conveyor that has a drive drum 30 is provided as the processing machine 28. The drive drum 30 is mechanically connected to the segment motor 4 in the region of the rotor 10. As a result, the rotor 10 is an integral part of the drive drum 30. The common shaft 8 is mounted in the bearings 32a and 32b and connected to a substructure 34 (steel girder structure or foundation) via the bearings 32a, 32b.

In a similar manner, the segment motor 4 can be integrated into other applications in the mining industry, such as in bucket-wheel excavator, mills, or crushers.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A drive apparatus for a processing machine for heavy industry, comprising: a motor excited by a permanent magnet, the motor including: a rotor mounted on a bearing element having a horizontal axis of rotation, a single coupling bearing mounted on the bearing element, and a stator mounted on the bearing element; wherein the motor comprises a segment motor, in which at least one of (i) the rotor and (ii) the stator is composed of a plurality of segments.

2. The drive apparatus as claimed in claim 1, further comprising:
a frequency converter;
wherein the segments of the stator are suppliable with electrical current by the frequency converter individually.

3. The drive apparatus as claimed in claim 1, wherein the segments of the rotor are arranged in a circular manner.

4. The drive apparatus as claimed in claim 1, wherein the segments of the stator are assembled to form a stator with a partially circular shape.

5. The drive apparatus as claimed in claim 1, wherein the segments of at least one of (i) the rotor and (ii) the stator are fastened to a load-bearing structure of the motor.

6. The drive apparatus as claimed in claim 1, wherein the bearing element is a rotatable shaft, the rotor is mounted on the rotatable shaft in a rotating manner and the stator is fastened to the rotatable shaft in a stationary manner.

7. The drive apparatus as claimed in claim 1, wherein the bearing element is a fixed axle, the rotor is mounted on the fixed axle in a rotatable manner and the stator is arranged on the fixed axle with a fixed position.

8. The drive apparatus as claimed in claim 1, wherein the motor operates up to 150 rpm.

9. The drive apparatus as claimed in claim 8, wherein the motor operates up to 100 rpm.

10. The drive apparatus as claimed in claim 1, wherein the heavy industry comprises raw material and mining industries.

11. A processing machine for heavy industry comprising the drive apparatus as claimed in claim 1.

12. The processing machine as claimed in claim 11, wherein the heavy industry comprises raw material and mining industries.

13. The processing machine as claimed in claim 11, wherein the drive apparatus is formed as a direct drive.

14. The processing machine as claimed in claim 13, wherein the processing machine comprises one of (i) a bucket-wheel excavator, (ii) a belt conveyor (28), (iii) a crusher, (iv) a mill and (v) a shaft conveyor system.

15. The processing machine as claimed in claim 11, wherein the processing machine comprises one of (i) a bucket-wheel excavator, (ii) a belt conveyor, (iii) a crusher, (iv) a mill and (v) a shaft conveyor system.

16. The drive apparatus as claimed in claim 1, wherein the drive apparatus is utilized as a direct drive in a processing machine for the heavy industry.

17. The drive apparatus as claimed in claim 16, wherein the heavy industry comprises raw material and mining industries.

\* \* \* \* \*